US008783696B2

(12) United States Patent
Murakami

(10) Patent No.: US 8,783,696 B2
(45) Date of Patent: Jul. 22, 2014

(54) VEHICLE-HEIGHT ADJUSTMENT APPARATUS OF MOTORCYCLE

(71) Applicant: Showa Corporation, Saitama (JP)

(72) Inventor: Yosuke Murakami, Shizuoka (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 13/800,813

(22) Filed: Mar. 13, 2013

(65) Prior Publication Data

US 2014/0084555 A1 Mar. 27, 2014

(30) Foreign Application Priority Data

Sep. 25, 2012 (JP) ................................. 2012-211527

(51) Int. Cl.
*B60G 17/04* (2006.01)

(52) U.S. Cl.
USPC ................... 280/5.514; 280/5.515; 280/6.157; 280/124.158; 280/124.159; 280/124.162; 188/322.15; 188/322.18; 267/221; 267/226

(58) Field of Classification Search
USPC ...................... 280/5.514, 5.515, 5.519, 6.157, 280/124.158, 124.159, 124.16, 124.162, 280/124.179; 188/312–314, 322.13, 188/322.14, 322.15, 322.18; 267/64.11, 267/64.13, 64.25, 64, 28, 221, 225, 226
See application file for complete search history.

(56) References Cited

U.S. PATENT DOCUMENTS

| 4,318,535 | A | * | 3/1982 | Imai ............................... 267/226 |
| 4,720,085 | A | * | 1/1988 | Shinbori et al. ........... 267/64.16 |
| 5,456,480 | A | * | 10/1995 | Turner et al. ................... 280/276 |
| 5,988,655 | A | * | 11/1999 | Sakai et al. ................ 280/6.159 |
| 8,109,371 | B2 | * | 2/2012 | Kondo et al. .............. 188/266.3 |
| 8,262,100 | B2 | * | 9/2012 | Thomas ..................... 280/5.514 |
| 2011/0227301 | A1 | * | 9/2011 | Nagai et al. ................ 280/6.157 |

FOREIGN PATENT DOCUMENTS

JP  1996-022680  3/1996

* cited by examiner

*Primary Examiner* — Faye M Fleming
*Assistant Examiner* — Darlene P Condra
(74) *Attorney, Agent, or Firm* — Keith H. Orum; Orum & Roth, LLC

(57) ABSTRACT

In a vehicle-height adjustment apparatus of a motorcycle having the hydraulic jack attached to the damper, damping force characteristics of a damper are stabilized, the influence of the charged gas pressure of an oil reservoir chamber is eliminated, and the sealing performance of a hydraulic jack is reduced. In the vehicle-height adjustment apparatus of a motorcycle, a back pressure chamber is provided on a side opposite to a jack chamber, with a plunger being interposed therebetween inside a hydraulic jack, and this back pressure chamber is communicated with a hydraulic chamber inside a damper tube.

6 Claims, 9 Drawing Sheets

VEHICLE-HEIGHT ADJUSTMENT APPARATUS OF MOTORCYCLE

BACKGROUND OF THE INVENTION

1. Field of the Invention

The present invention relates to a vehicle-height adjustment apparatus of a motorcycle.

2. Description of the Related Art

Desirably, the vehicle height of motorcycles is set relatively low such that even short riders can easily set their feet on ground, as this prevents the motorcycles from falling down at the time of stopping. On the other hand, motorcycles are required to have a certain degree of vehicle height from the viewpoint of bank angles, shock absorption, or the like at the time of running. In addition, some motorcycles for the market in America are designed to have a low vehicle height when they are not running so that they meet market needs in terms of appearance.

In view of this, there has been proposed the vehicle-height adjustment apparatus of a motorcycle as described in Japanese Examined Patent Publication No. H8-22680. The vehicle-height adjustment apparatus has a damper tube, a piston rod, a hydraulic jack, a suspension spring, a hydraulic pump, and a switching valve. The damper tube is provided on one side of a vehicle body and an axle. The piston rod is provided on the other side of the vehicle body and the axle and performs extension and compression movements relative to the damper tube by sliding in a hydraulic chamber inside the damper tube. The hydraulic jack is provided on one side of the damper tube and the piston rod. The suspension spring is interposed between a spring bearing supported by a plunger inserted in the jack chamber of the hydraulic jack and a spring bearing provided on the other side of the damper tube and the piston rod. The hydraulic pump is caused to perform a pumping operation by the extension and compression movements of the piston rod relative to the damper tube to supply and drain the oil of the hydraulic chamber inside the damper tube to and from the jack chamber of the hydraulic jack. The switching valve is closed such that the operating oil supplied to the jack chamber of the hydraulic jack is stopped, or is opened such that the operating oil is discharged. The vehicle-height adjustment apparatus is capable of adjusting a vehicle height by the tension and compression movements of the piston rod relative to the damper tube.

[Patent Literature 1] Japanese Examined Patent Publication No. H8-22680

SUMMARY OF THE INVENTION

The vehicle-height adjustment apparatus of the motorcycle described in Japanese Examined Patent Publication No. H8-22680 has the following problems.

(1) The amount of the oil inside the damper changes with the operation of the hydraulic jack, which results in a change in the compression ratio and the inner pressure of the damper and influences the damping force characteristics of the damper.

(2) The charged gas pressure of an oil reservoir chamber that increases in the compression stroke of the damper acts on the jack chamber of the hydraulic jack and becomes a load intended to protrude the plunger of the hydraulic jack. This results in a limitation in which the initial load of the suspension spring cannot be made smaller than one obtained by multiplying the charged gas pressure by the pressure receiving area of the plunger.

(3) In the hydraulic jack, the side opposite to the jack chamber via the plunger is opened to the air. Therefore, the sealing part of the plunger sliding on the inner periphery of the hydraulic jack is required to have high sealing performance in order to seal the high pressure of the jack chamber relative to atmospheric pressure.

It is an object of the present invention to stabilize the damping force characteristics of a damper, eliminate the influence of the charged gas pressure of an oil reservoir chamber, and reduce the sealing performance of a hydraulic jack in the vehicle-height adjustment apparatus of a motorcycle having the hydraulic jack attached to the damper.

According to a first aspect of the present invention, there is provided a vehicle-height adjustment apparatus of a motorcycle for adjusting a vehicle height, this apparatus including: a damper in which a piston rod slides in a hydraulic chamber inside a damper tube; a hydraulic jack provided on one of the damper tube and the piston rod; a jack chamber provided inside the hydraulic jack; a plunger inserted in the jack chamber; a suspension spring interposed between a spring bearing provided on the other one of the damper tube and the piston rod and a spring bearing supported by the plunger; and a hydraulic pump that is caused to perform a pumping operation by extension and compression movements of the piston rod relative to the damper tube and supplies and drains oil of the hydraulic chamber inside the damper tube to and from the jack chamber of the hydraulic jack, the apparatus further including: a back pressure chamber that is provided on a side opposite to the jack chamber, with the plunger being interposed therebetween inside the hydraulic jack, and that is communicated with the hydraulic chamber inside the damper tube.

According to a second aspect of the present invention, in the above aspect, preferably a pressure receiving area of the plunger on a side of the jack chamber may be made different from a pressure receiving area of the plunger on a side of the back pressure chamber inside the hydraulic jack.

According to a third aspect of the present invention, in the above aspect, preferably the pressure receiving area of the plunger on the side of the jack chamber may be made substantially the same as the pressure receiving area of the plunger on the side of the back pressure chamber inside the hydraulic jack.

According to an aspect of the present invention, in any of the first to third aspects, preferably the jack chamber and the back pressure chamber inside the hydraulic jack may be communicated with a piston-side hydraulic chamber and a rod-side hydraulic chamber inside the damper tube, respectively, and hydraulic pressure of the jack chamber may be made different from hydraulic pressure of the back pressure chamber by pressure of a damping force of the damper.

First Aspect (a) Both the jack chamber and the back pressure chamber facing each other with the plunger interposed therebetween inside the hydraulic jack are communicated with the hydraulic chamber inside the damper tube. Accordingly, a change in the amount of the oil inside the damper with the operation of the hydraulic jack can be reduced. As a result, a change in the compression ratio and the inner pressure of the damper can be reduced, and the damping force characteristics of the damper can be stabilized.

(b) The charged gas pressure of an oil reservoir chamber that increases in the compression stroke of the damper evenly acts on both the jack chamber and the back pressure chamber facing each other with the plunger interposed therebetween inside the hydraulic jack. The charged gas pressure is prevented from becoming a load intended to protrude the plunger of the jack chamber. As a result, influence on the settings of the initial load of the suspension spring or the like can be eliminated.

(c) In the hydraulic jack, the back pressure chamber and the jack chamber face each other with the plunger interposed therebetween. Further, the air exists on the outside of the back pressure chamber. Therefore, the pressure relationship the jack chamber>the back pressure chamber>the air is established, and the sealing part of the plunger sliding on the inner periphery of the hydraulic jack is only required to seal the jack chamber such that the pressure of the jack chamber becomes greater than the air (back pressure chamber). As a result, the sealing performance of the hydraulic jack can be reduced.

Second Aspect (d) Inside the hydraulic jack, the pressure receiving area of the plunger on the side of the jack chamber is made different from that of the plunger on the side of the back pressure chamber. Thus, if the pressure receiving area on the side of the jack chamber is greater than the pressure receiving area on the side of the back pressure chamber when the charged gas pressure of the oil reservoir chamber reaches the jack chamber and the back pressure chamber, the plunger is caused to move to the direction in which the plunger protrudes from the hydraulic jack due to the charged gas pressure to prevent the play of the short suspension spring.

Third Aspect (e) Inside the hydraulic jack, the pressure receiving area of the plunger on the side of the jack chamber is made substantially the same as that of the plunger on the side of the back pressure chamber. Thus, a change in the amount of the oil inside the damper with the operation of the hydraulic jack can be cancelled.

Fourth Aspect (f) The jack chamber and the back pressure chamber inside the hydraulic jack are communicated with the piston-side hydraulic chamber and the rod-side hydraulic chamber inside the damper tube, respectively, and the hydraulic pressure of the jack chamber is made different from that of the back pressure chamber by the pressure of the damping force of the damper. When the hydraulic pump supplies and drains the oil of the hydraulic chambers inside the damper tube to and from the jack chamber of the hydraulic jack in accordance with the extension and compression movements of the damper (as a switching valve is controlled to be opened and closed), the hydraulic pressure of the damping force of the damper can be used as assistant energy for elevating the plunger of the hydraulic jack. For example, the hydraulic pressure of the damping force of the damper can assist the withdrawal of the plunger of the hydraulic jack in the extension stroke of the damper and assist the protrusion of the plunger of the hydraulic jack in the compression stroke thereof.

DESCRIPTION OF THE PREFERRED EMBODIMENTS

Figure 1:
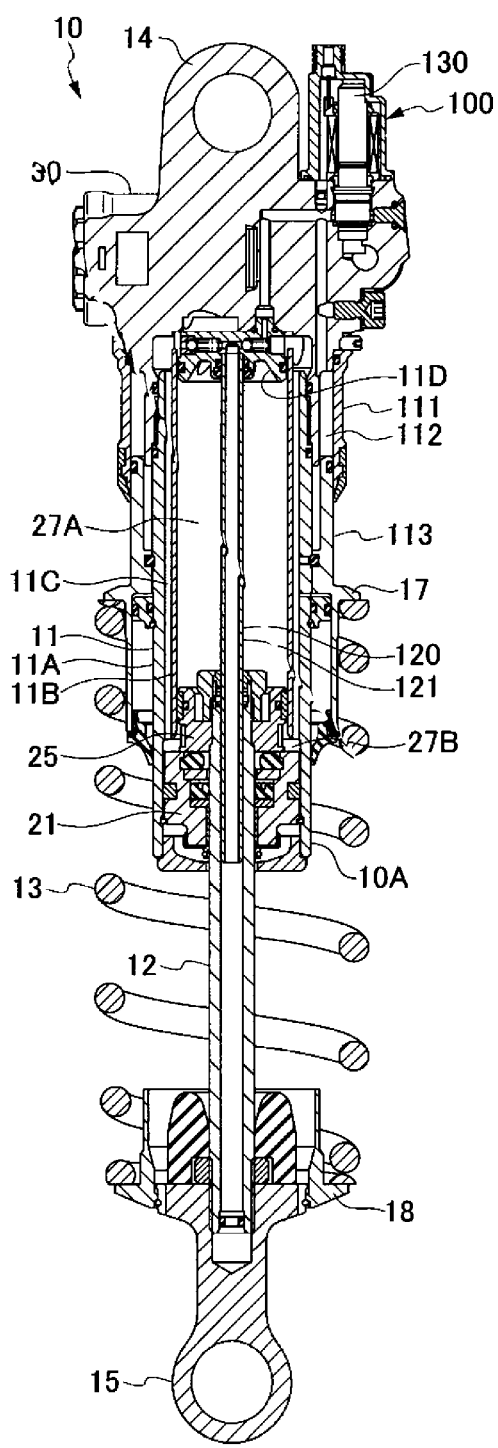
FIG. 1 is an entire cross-sectional view showing a hydraulic shock absorber.
Figure 2:
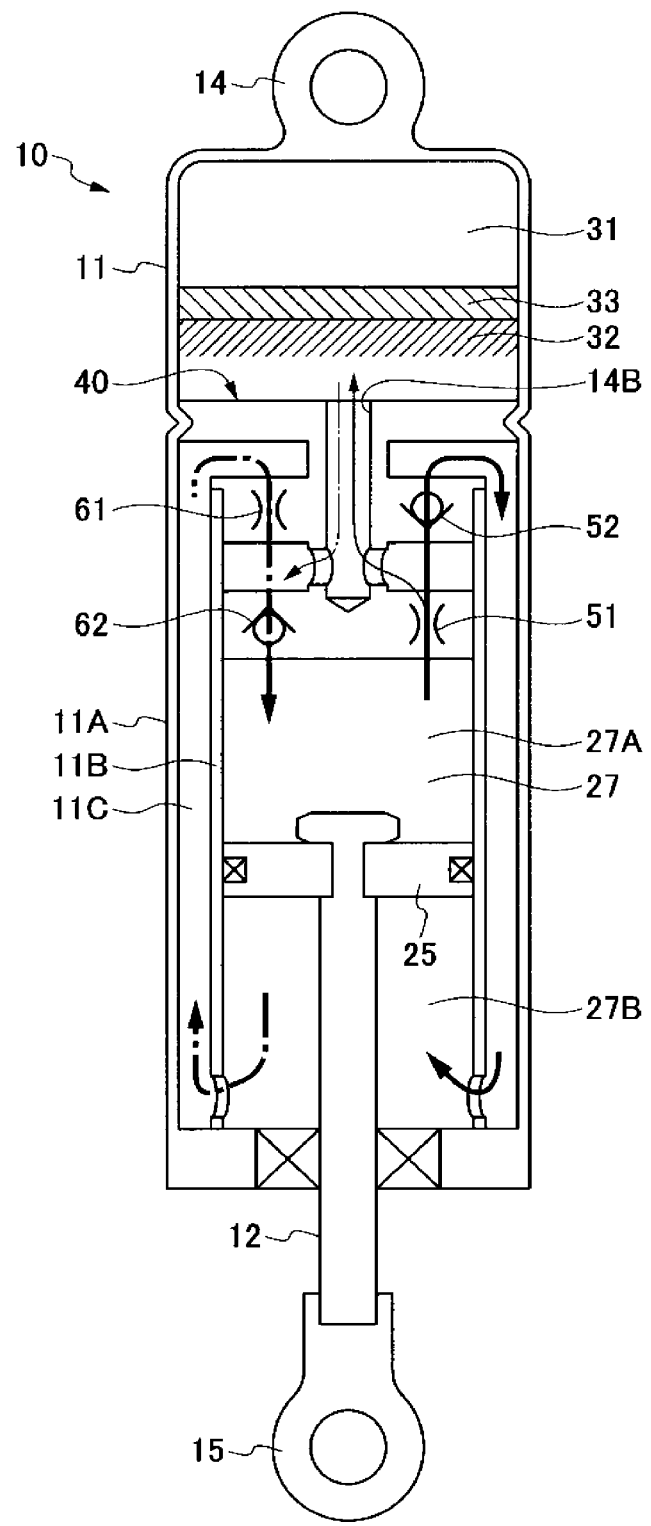
FIG. 2 is a schematic view showing the flow of oil at extension and compression damping operations in the hydraulic shock absorber.

As shown in FIGS. 1 and 2, a hydraulic shock absorber 10 has a damper 10A in which a hollow piston rod 12 attached to the side of an axle is slidably inserted in a hydraulic chamber 27 of a damper tube 11 attached to the side of a vehicle body, and has a suspension spring 13 interposed on the outside of the damper tube 11 and the piston rod 12.

The damper tube 11 has a vehicle-body-side attachment member 14, and the piston rod 12 has an axle-side attachment member 15. At the outer peripheral part of the damper tube 11, a hydraulic jack 111 of a vehicle-height adjustment apparatus 100 that will be described below is provided. A plunger 113 inserted in a jack chamber 112 of the hydraulic jack 111 has a spring bearing 17. In addition, the outside part of the axle-side attachment member 15 has a spring bearing 18. The suspension spring 13 is interposed between the spring bearing 17 and the spring bearing 18. The setting length (spring load) of the suspension spring 13 is adjusted by the elevating operation of the hydraulic jack 111. By the spring force of the suspension spring 13, an impact force received by a vehicle from a road surface is absorbed.

The damper tube 11 has, at the opening part thereof, a rod guide 21 through which the piston rod 12 penetrates. The rod guide 21 is liquid-tightly inserted in the damper tube 11 and causes the piston rod 12 to be liquid-tightly slidable at the inner diameter part thereof having an oil seal 22, a bush 23, and a dust seal 24.

In the hydraulic shock absorber 10, the damper 11 is a dual tube composed of an outer cylinder 11A and an inner cylinder 11B. A piston 25 inserted at the tip end part of the piston rod 12 is fixed by a nut 26. By the piston 25 slidably inserted at the inner periphery of the inner cylinder 11B, the hydraulic chamber 27 of the damper tube 11 is divided into a piston-side hydraulic chamber 27A and a rod-side hydraulic chamber 27B.

Figure 3:
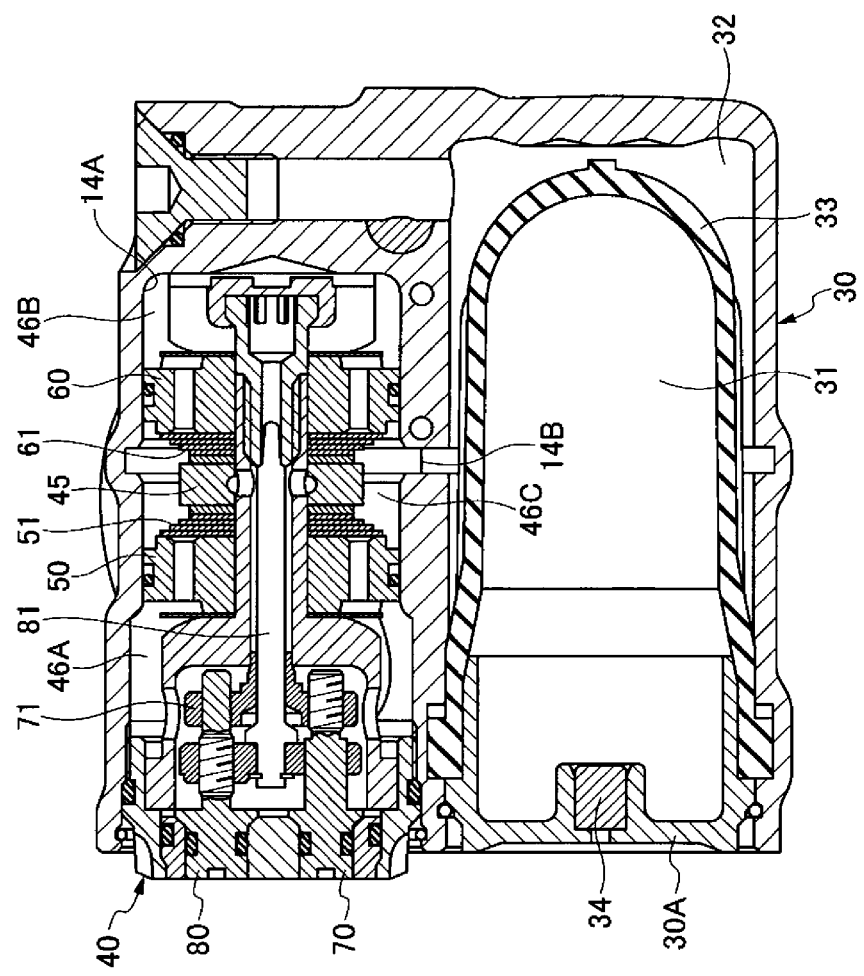
FIG. 3 is a cross-sectional view showing a damping force generation device.

As shown in FIG. 3, the hydraulic shock absorber 10 has a sub-tank 30 fixed to the vehicle-body-side attachment member 14, and an air chamber 31 and an oil reservoir chamber 32 provided inside the sub-tank 30 sealed by a cap 30A are separated by a bladder 33. The oil reservoir chamber 32 pressed by the air chamber 31 whose pressure becomes high via an air valve 34 of the cap 30A is provided so as to communicate with the hydraulic chamber 27 of the damper tube 11. The oil reservoir chamber 32 compensates for the volume (including a volume corresponding to an increase in the temperature of the oil) of the piston rod 12 that enters and leaves the hydraulic chamber 27 of the damper tube 11.

In the hydraulic shock absorber 10, a damping force generation device 40 is provided between the piston-side hydraulic chamber 27A and the rod-side hydraulic chamber 27B of the damper tube 11.

Figure 4:
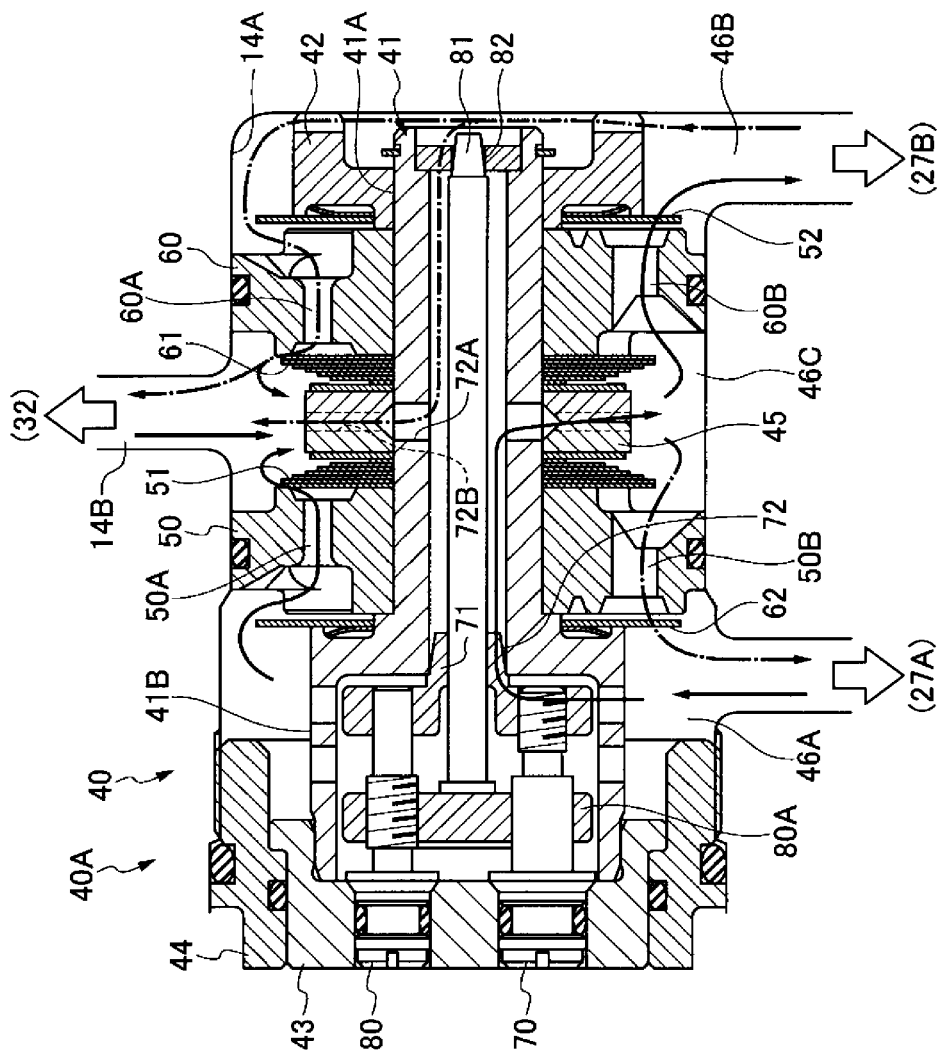
FIG. 4 is a cross-sectional view showing the substantial part of FIG. 3.

In a state of being sub-assembled in a valve unit 40A shown in FIG. 4, the damping force generation device 40 is inserted in a valve accommodation hole 14A provided between the damper tube 11 and the sub-tank 30 in the vehicle-body-side attachment member 14 from the outside and included therein. The valve unit 40A of the damping force generation device 40 has a valve piece 41, an inner valve holder 42, an outer valve holder 43, and a cap 44. The inner valve holder 42 is fitted in a small-diameter part 41A on the inner end side of the valve piece 41. The outer valve holder 43 is fitted in a large-diameter part 41B on the outer end side of the valve piece 41 from the outside and engaged in the shaft direction. The cap 44 is liquid-tightly fitted in the outer valve holder 43 from the outside and engaged in the shaft direction.

In addition, the valve unit 40A of the damping force generation device 40 has a center plate 45 at a center along the shaft direction at the outer periphery of the small-diameter part 41A of the valve piece 41. In the shaft direction in which the center plate 45 at the outer periphery of the small-diameter part 41A of the valve piece 41 is interposed, an extension-side check valve 62, a compression-side piston 50, and a compression-side damping valve 51 are sequentially equipped from the side of the step surface formed between the smaller-diameter part 41A and the large-diameter part 41B. From the side of the end surface of the inner valve holder 42, a compression-side check valve 52, an extension-side piston 60, and an extension-side damping valve 61 are sequentially equipped. A group of the compression-side check valve 52, the extension-side piston 60, and the extension-side damping valve 61 and a group of the extension-side check valve 62, the compression-side piston 50, and the compression-side damping valve 51 are arranged in a line symmetry with the center plate 45 interposed therebetween, and fixed by pressing together with the center plate 45 between the end surface of the inner valve holder 42 and the step surface formed between the small-diameter part 41A and the large-diameter part 41B of the valve piece 41.

The valve unit 40A of the damping force generation device 40 is inserted in the valve accommodation hole 14A from the outside and fixed in such a manner that the tip end surface of the inner valve holder 42 is stabbed into the bottom surface of the valve accommodation hole 14A in the shaft direction and the cap 44 is liquid-tightly screwed in the opening screw part of the valve accommodation hole 14A. At this time, in the damping force generation device 40, the outer peripheries of the compression-side piston 50 and the extension-side piston 60 are liquid-tightly fixed to the inner periphery of the valve accommodation hole 14A. In addition, the space of the compression-side piston 50 on the side opposite to the extension-side piston 60 in the valve accommodation hole 14A is used as a common flow path 46A for extension and compression (hereinafter simply referred to as the common flow path 46A) communicated with the piston-side hydraulic chamber 27A. Moreover, the space of the extension-side piston 60 on the side opposite to the compression-side piston 60 in the valve accommodation hole 14A is used as a common flow path 46B for extension and compression (hereinafter simply referred to as the common flow path 46B) communicated with the rod-side hydraulic chamber 27B via an outer flow path 11C of the damper tube 11 that will be described later. Further, annular space held between the compression-side piston 50 and the extension-side piston 60 around the center plate 45 in the valve accommodation hole 14A is used as a common flow path 46C for extension and compression (hereinafter simply referred to as the common flow path 46C) communicated with the oil reservoir chamber 32 via a communication path 14B provided in the vehicle-body-side attachment member 14. Furthermore, in the damping force generation device 40, the compression-side piston 50 has a compression-side flow path 50A opened and closed by the compression-side damping valve 51 and an extension-side flow path 50B opened and closed by the extension-side check valve 62, and the extension-side piston 60 has a compression-side flow path 60B opened and closed by the compression-side check valve 52 and an extension-side flow path 60A opened and closed by the extension-side damping valve 61. In the damping force generation device 40, the piston-side hydraulic chamber 27A and the rod-side hydraulic chamber 27B of the damper tube 11 are communicated with each other via the common flow paths 46A, 46B, and 46C provided in the vehicle-body-side attachment member 14, the compression-side flow path 50A and the extension-side flow path 50B provided in the compression-side piston 50, the compression-side flow path 60B and the extension-side flow path 60A provided in the extension-side piston 60, the outer flow path 11C provided at the annular gap between the outer cylinder 11A and the inner cylinder 11B of the damper tube 11, and a hole flow path provided on the lower end side of the inner cylinder 11B (the piston 25 does not have a flow path via which the piston-side hydraulic chamber 27A and the rod-side hydraulic chamber 27B are communicated with each other).

Accordingly, in the hydraulic shock absorber 10, the compression-side flow paths (the common flow paths 46A, 46B, and 46C and the compression-side flow paths 50A and 60B), which cause the oil of the piston-side hydraulic chamber 27A of the damper tube 11 to flow from the outer flow path 11C to the rod-side hydraulic chamber 27B of the damper tube 11 in the compression-side stroke, are provided in the damping force generation device 40. The compression-side damping valve 51 is provided on the upstream side of the compression-side flow paths (the common flow paths 46A, 46B, and 46C and the compression-side flow paths 50A and 60B), and the compression-side check valve 52 is provided on the downstream side thereof. The intermediate part between the compression-side damping valve 51 and the compression-side check valve 52 in the compression-side flow paths (the common flow paths 46A, 46B, and 46C and the compression-side flow paths 50A and 60B) is communicated with the oil reservoir chamber 32 via the common flow path 46C and the communication path 14B.

In addition, the extension-side flow paths (the common flow paths 46A, 46B, and 46C and the extension-side flow paths 50B and 60A), which cause the oil of the rod-side hydraulic chamber 27B of the damper tube 11 to flow from the outer flow path 11C to the piston-side hydraulic chamber 27A of the damper tube 11 in an extension-side process, are provided in the damping force generation device 40. The extension-side damping valve 61 is provided on the upstream side of the extension-side flow paths (the common flow paths 46A, 46B, and 46C and the extension-side flow paths 50B and 60A), and the extension-side check valve 62 is provided on the downstream side thereof. The intermediate part between the extension-side damping valve 61 and the extension-side check valve 62 in the extension-side flow paths (the common flow paths 46A, 46B, and 46C and the extension-side flow paths 50B and 60A) is communicated with the oil reservoir chamber 32 via the common flow path 46C and the communication path 14B.

As shown in FIG. 4, in the damping force generation device 40, a compression-side bypass flow path 72 and an extension-side bypass flow path 82 via which the piston-side hydraulic chamber 27A and the rod-side hydraulic chamber 27B of the damper tube 11 are communicated with the oil reservoir chamber 32 may be, as required, provided in a hollow part provided on the center axis between the small-diameter part 41A and the large-diameter part 41B of the valve piece 41 so as to bypass the compression-side damping valve 51 and the extension-side damping valve 61. The adjustment of a compression-side damping force can be made in such a manner that the opening area of the compression-side bypass flow path 72 is adjusted using a compression-side damping force adjustment valve 71 operated from the outside by a compression-side adjuster 70 provided in the outer valve holder 43. The extension-side bypass flow path 82 is opened to the common flow path 46B and opened to the common flow path 46C via a hole 72A provided in the valve piece 41 and a hole 72B provided in the center plate 45. The compression-side bypass flow path 72 is opened to the common flow path 46A and opened to the common flow path 46C via the hole 72A provided in the valve piece 41 and the hole 72B provided in the center plate 45.

Note that an extension-side adjuster 80 is liquid-tightly pivotally attached to the outer valve holder 43 so as to make the rotation thereof operable from the outside and has a slider 80A screwed with the male screw part thereof. The slider 80A moved by the rotation of the extension-side adjuster 80 presses and moves the rod-like base end part of an extension-side damping force adjustment valve 81 to cause the tip end needle valve of the extension-side damping force adjustment valve 81 to enter and leave the opening of the extension-side bypass flow path 82. In addition, the compression-side adjuster 70 is pivotally attached to the outer valve holder 43 so as to make the rotation thereof operable from the outside. The compression-side damping force adjustment valve 71 is loosely inserted around the rod of the extension-side damping force adjustment valve 81, has the male screw part of the compression-side adjuster 70 screwed with the flange part thereof, and causes the tip end needle valve of the compression-side damping force adjustment valve 71 moved by the rotation of the compression-side adjuster 70 to enter and leave the opening of the compression-side bypass flow path 72. The slider 80A of the extension-side adjuster 80 has the intermediate shaft part of the compression-side adjuster 70 inserted therethrough to stop the rotation of the slider 80A. The flange part of the compression-side damping force adjustment valve 71 has the tip end shaft part of the extension-side adjuster 80 inserted therethrough to stop the rotation of the compression-side damping force adjustment valve 71.

Accordingly, the hydraulic shock absorber 10 performs a damping operation as follows.

(Compression-Side Stroke) (Flows as Indicated by Solid Lines in FIGS. 2 and 4)

With an increase in the pressure of the oil of the piston-side hydraulic chamber 27A, the compression-side damping valve 51 of the compression-side flow path 50A of the compression-side piston 50 in the damping force generation device 40 is pressed and opened to generate a compression-side damping force. The oil flowing out from the compression-side damping valve 51 to the common flow path 46C is divided into two by the common flow path 46C. One oil flows from the compression-side check valve 52 of the compression-side flow path 60B of the extension-side piston 60 to the rod-side hydraulic chamber 27B via the outer flow path 11C of the damper tube 11, and the other oil is discharged to the oil reservoir chamber 32. The other oil discharged to the oil reservoir chamber 32 compensates for oil corresponding to the volume of an area where the piston rod 12 enters.

(Extension-Side Stroke) (Flows as Indicated by Arrows of Dashed Lines in FIGS. 2 and 4)

With an increase in the pressure of the oil of the rod-side hydraulic chamber 27B through the outer flow path 11C of the damper tube 11, the extension-side damping valve 61 of the extension-side flow path 60A of the extension-side piston 60 in the damping force generation device 40 is pressed and opened to generate an extension-side damping force. The oil flowing out from the extension-side damping valve 61 to the common flow path 46C merges with the oil replenished from the oil reservoir chamber 32 and then flows to the piston-side hydraulic chamber 27A via the extension-side check valve 62 of the extension-side flow path 50B of the compression-side piston 50. The oil replenished from the oil reservoir chamber 32 compensates for oil corresponding to the volume of an area where the piston rod 12 leaves.

As shown in FIG. 1 and FIGS. 5 to 8, the vehicle-height adjustment apparatus 100 has the hydraulic jack 111 at the outer periphery of the outer cylinder 11A of the damper tube 11. The hydraulic jack 111 has the plunger 113 that partitions the jack chamber 112. The plunger 113 is caused to protrude from the jack chamber 112 due to the operating oil supplied to the jack chamber 112 and supports the upper end of the suspension spring 13 at the lower surface thereof.

Figure 5:
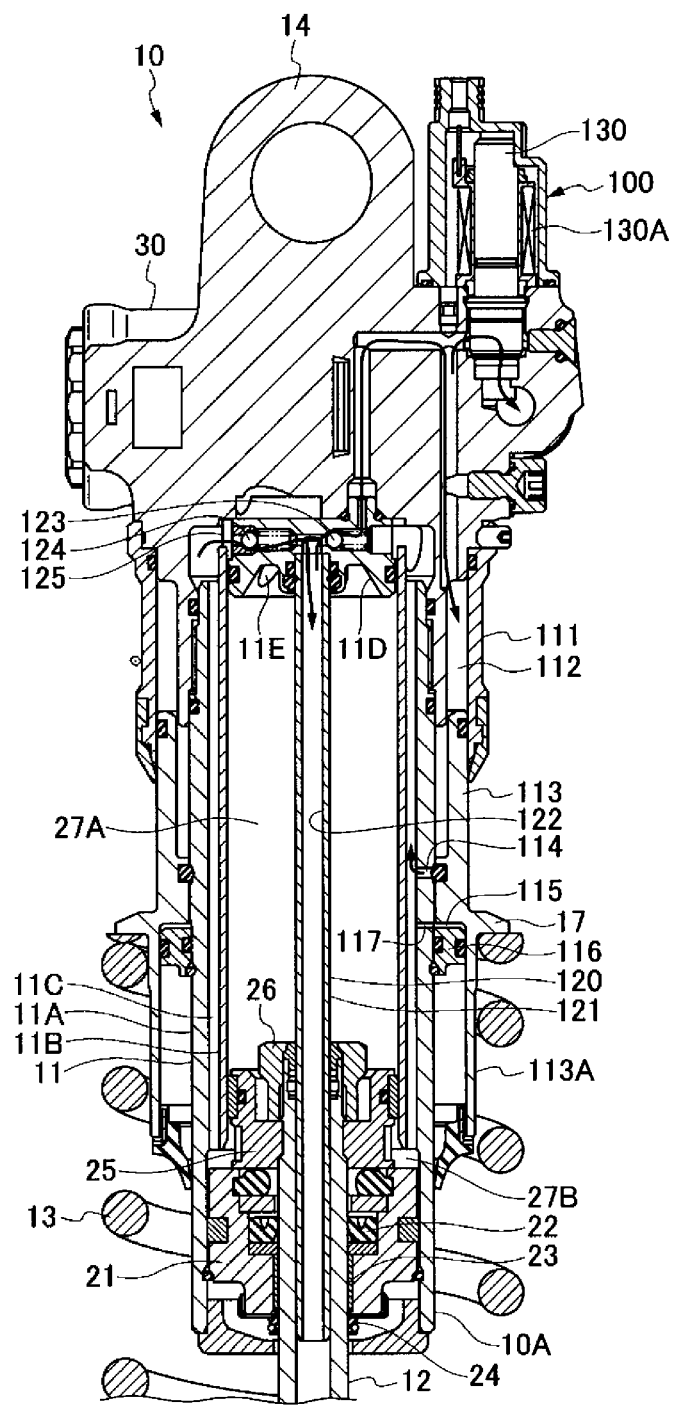
FIG. 5 is an entire cross-sectional view showing the flow of oil at a pumping operation in the hydraulic shock absorber.
Figure 7:
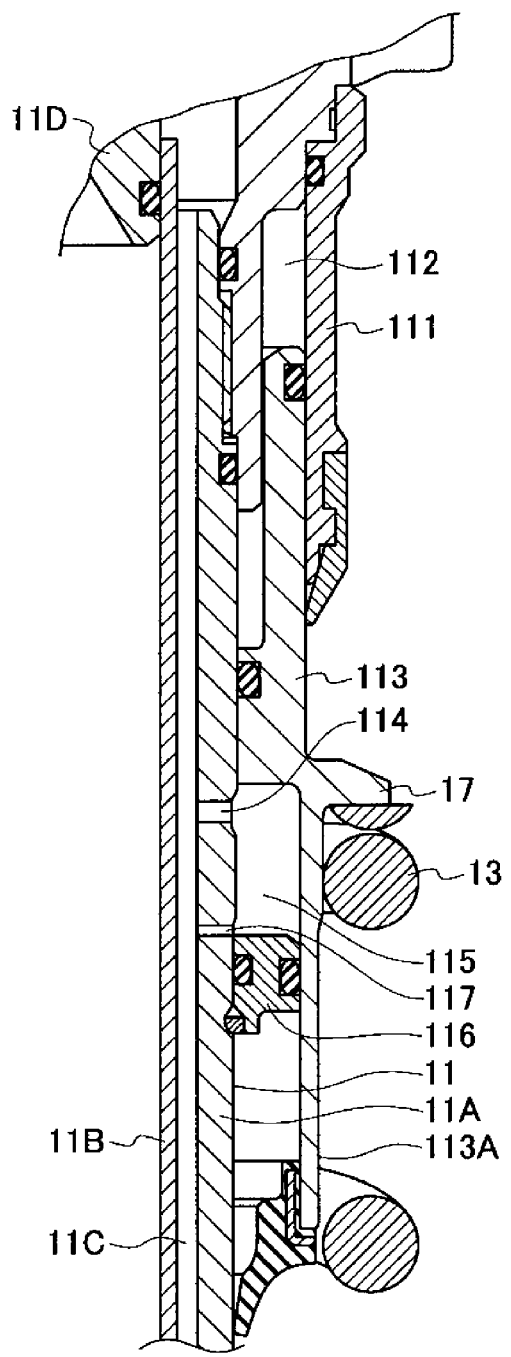
FIG. 7 is a cross-sectional view showing the elevation process of a hydraulic jack.
Figure 8:
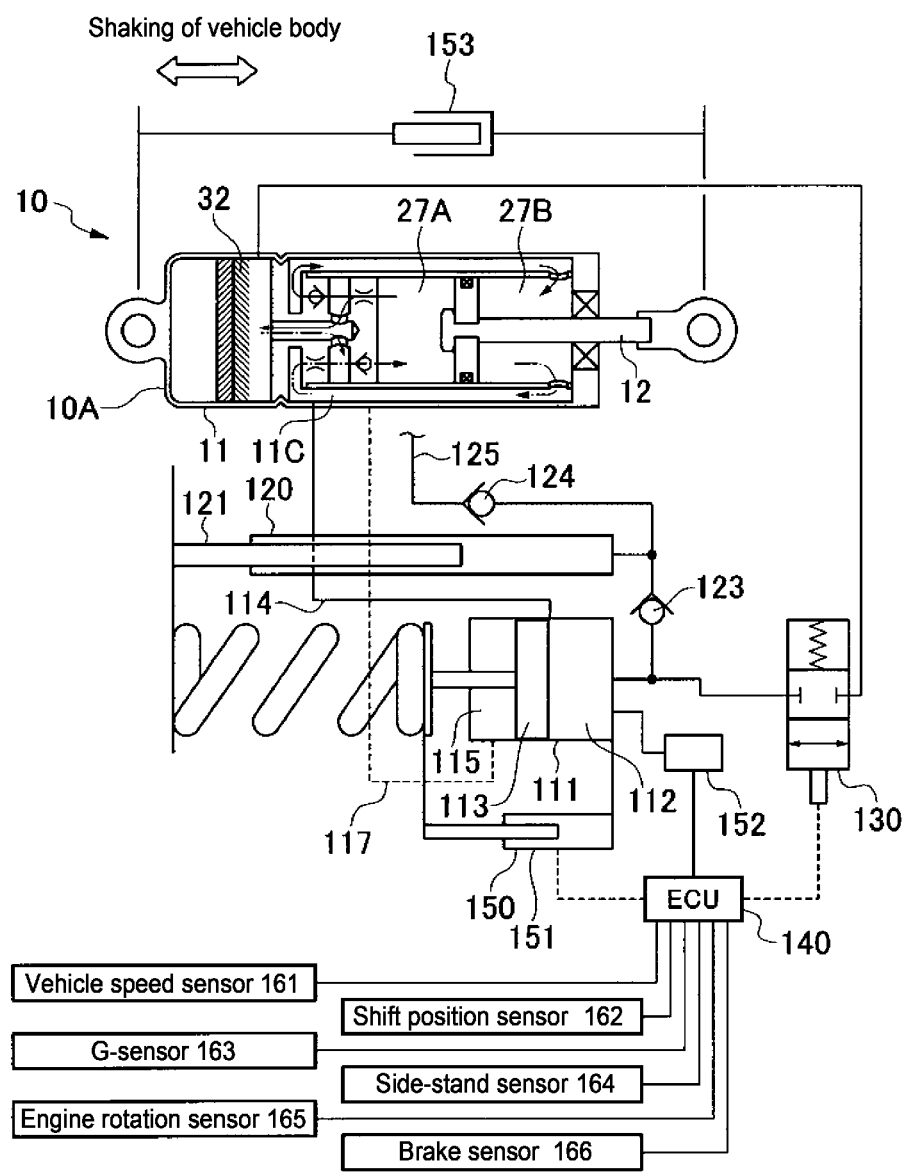
FIG. 8 is a circuit diagram showing a vehicle-height adjustment apparatus.

Note that in the hydraulic jack 111, the outer cylinder 11A of the damper tube 11 has an oil return path 114 that causes the operating oil of the jack chamber 112 to return to the oil reservoir chamber 32 when the plunger 113 reaches its protruding end in the jack chamber 112, and the oil return path 114 is opened to the outer flow path 11C of the damper tube 11 (FIGS. 5, 7, and 8).

In the vehicle-height adjustment apparatus 100, the oil return path 114 of the hydraulic jack 111 is opened in the outer flow path 11C of the damper tube 11. Therefore, the oil return path 114 is not opened in the inner peripheral surface of the tube that directly faces the hydraulic chamber of the damper tube 11. As a result, no difficulties arise in the slide and abrasion of the piston 25 that slides on the inner peripheral surface.

Here, in the vehicle-height adjustment apparatus 100, a back pressure chamber 115 is provided on the side opposite to the jack chamber 112 with the plunger 113 interposed therebetween inside the hydraulic jack 111, and is communicated with the rod-side hydraulic chamber 27B inside the damper tube 11 (or may be communicated with the piston-side hydraulic chamber 27A and the oil reservoir chamber 32 inside the damper tube 11). As shown in FIG. 7, the back pressure chamber 115 is sealed by an annular piece 116 fixedly arranged at the annular gap between the outer periphery of the outer cylinder 11A of the damper tube 11 and the inner periphery of an extended cylinder part 113A of the plunger 113. According to this embodiment, a communication path 117 to the back pressure chamber 115 is provided in the outer cylinder 11A of the damper tube 11 and opened to the outer flow path 11C of the damper tube 11 (FIGS. 5, 7, and 8).

At this time, the jack chamber 112 and the back pressure chamber 115 inside the hydraulic jack 111 are communicated with the piston-side hydraulic chamber 27A and the rod-side hydraulic chamber 27B inside the damper tube 11, respectively (see FIG. 9), and the hydraulic pressure of the jack chamber 112 is made different from that of the back pressure chamber 115 by the pressure of the damping force of the damper 10A.

In addition, inside the hydraulic jack 111, the pressure receiving area of the plunger 113 on the side of the jack chamber 112 is made different from that of the plunger 113 on the side of the back pressure chamber 115. Alternatively, inside the hydraulic jack 111, the pressure receiving area of the plunger 113 on the side of the jack chamber 112 is made substantially the same as that of the plunger 113 on the side of the back pressure chamber 115.

By using the hydraulic jack 111 having the back pressure chamber 115, the vehicle-height adjustment apparatus 100 produces the following functions and effects.

(a) Both the jack chamber 112 and the back pressure chamber 115 facing each other with the plunger 113 interposed therebetween inside the hydraulic jack 111 are communicated with the hydraulic chambers 27A and 27B inside the damper tube 11, respectively. Accordingly, a change in the amount of the oil inside the damper 10A with the operation of the hydraulic jack 111 can be reduced. As a result, a change in the compression ratio and the inner pressure of the damper 10A can be reduced, and the damping force characteristics of the damper 10A can be stabilized.

(b) The charged gas pressure of the oil reservoir chamber 32 that increases in the compression stroke of the damper 10A evenly acts on both the jack chamber 112 and the back pressure chamber 115 facing each other with the plunger 113 interposed therebetween inside the hydraulic jack 111. The charged gas pressure is prevented from becoming a load intended to protrude the plunger 113 of the jack chamber 112. As a result, influence on the settings of the initial load of the suspension spring 13 or the like can be eliminated.

(c) In the hydraulic jack 111, the back pressure chamber 115 and the jack chamber 112 face each other with the plunger 113 interposed therebetween. Further, the air exists on the outside of the back pressure chamber 115. Therefore, the pressure relationship the jack chamber 112>the back pressure chamber 115>the air is established, and the sealing part of the plunger 113 sliding on the inner periphery of the hydraulic jack 111 is only required to seal the jack chamber 112 such that the pressure of the jack chamber 112 becomes greater than the air (back pressure chamber 115). As a result, the sealing performance of the hydraulic jack 111 can be reduced.

(d) Inside the hydraulic jack 111, the pressure receiving area of the plunger 113 on the side of the jack chamber 112 is made different from that of the plunger 113 on the side of the back pressure chamber 115. Thus, if the pressure receiving area on the side of the jack chamber 112 is greater than the pressure receiving area on the side of the back pressure chamber 115 when the charged gas pressure of the oil reservoir chamber 32 reaches the jack chamber 112 and the back pressure chamber 115, the plunger 113 is caused to move to the direction in which the plunger 113 protrudes from the hydraulic jack 111 due to the charged gas pressure to prevent the play of the short suspension spring 13.

(e) Inside the hydraulic jack 111, the pressure receiving area of the plunger 113 on the side of the jack chamber 112 is made substantially the same as that of the plunger 113 on the side of the back pressure chamber 115. Thus, a change in the amount of the oil inside the damper 10A with the operation of the hydraulic jack 111 can be cancelled.

(f) The jack chamber 112 and the back pressure chamber 115 inside the hydraulic jack 111 are communicated with the piston-side hydraulic chamber 27A and the rod-side hydraulic chamber 27B inside the damper tube 11, respectively, and the hydraulic pressure of the jack chamber 112 is made different from that of the back pressure chamber 115 by the pressure of the damping force of the damper 10A. When a hydraulic pump 120 supplies and drains the oil of the hydraulic chambers 27A and 27B inside the damper tube 11 to and from the jack chamber 112 of the hydraulic jack 111 in accordance with the extension and compression movements of the damper 10A (as the switching valve 130 is controlled to be opened and closed), the hydraulic pressure of the damping force of the damper 10A can be used as assistant energy for elevating the plunger 113 of the hydraulic jack 111. For example, the hydraulic pressure of the damping force of the damper 10A can assist the withdrawal of the plunger 113 of the hydraulic jack 111 in the extension stroke of the damper 10A and assist the protrusion of the plunger 113 of the hydraulic jack 111 in the compression stroke thereof.

The vehicle-height adjustment apparatus 100 has the hydraulic pump 120 caused to perform a pumping operation by the extension and compression movements of the piston rod 12 relative to the damper tube 11 to supply and drain the operating oil to and from the jack chamber 112 of the hydraulic jack 111.

In the hydraulic pump 120, a hollow pipe 121 provided so as to stand at an end piece 11D provided at the upper end of the inner cylinder 11B in the damper tube 11 is slidably inserted in a pump chamber 122 formed by the hollow part of the piston rod 12. The end piece 11D of the damper tube 11 has a communication hole 11E through which the piston-side hydraulic chamber 27A is communicated with the damping force generation device 40, the outer flow path 11C, and the oil reservoir chamber 32.

The hydraulic pump 120 has an ejection check valve 123 with which the operating oil of the pump chamber 122 pressurized by the compression movement, in which the piston rod 12 enters the damper tube 11 and the hollow pipe 121, is ejected to the side of the hydraulic jack 111. In addition, the hydraulic pump 120 has a suction check valve 124 with which the operating oil inside the damper tube 11 is suctioned into the pump chamber 122 whose pressure becomes negative with the extension movement in which the piston rod 12 leaves the damper tube 11 and the hollow pipe 121. In the hydraulic pump 120, the ejection check valve 123 and the suction check valve 124 are included in the end piece 11D.

Figure 6:
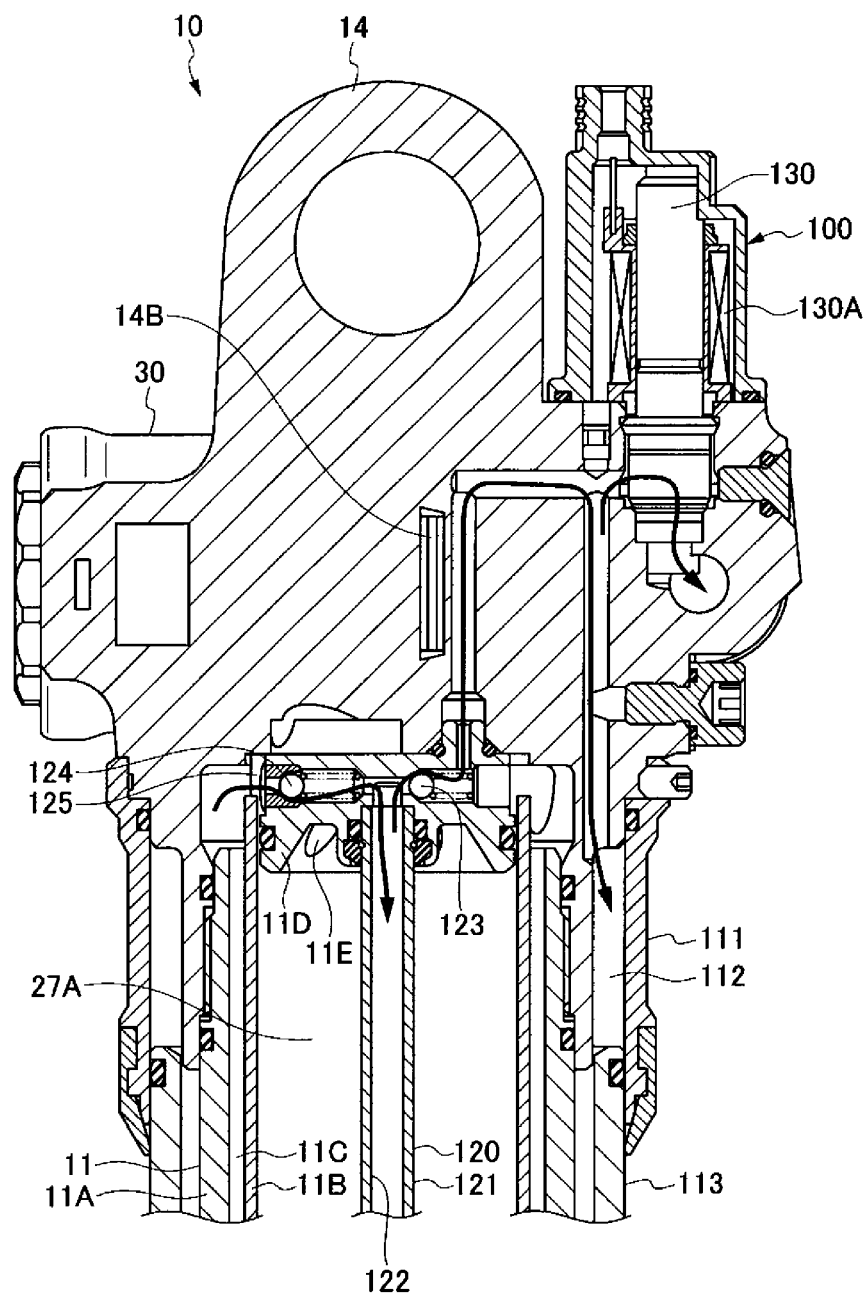
FIG. 6 is a cross-sectional view showing the substantial part of the FIG. 5.

Note that a suction port 125, through which the oil of the hydraulic chambers 27A and 28B and the oil reservoir chamber 32 inside the damper tube 11 is suctioned into the pump chamber 122 of the hydraulic pump 120, is opened in the outer flow path 11C of the damper tube 11 (FIGS. 5, 6, and 8).

In the vehicle-height adjustment apparatus 100, the suction port 125 to the pump chamber 122 of the hydraulic pump 120 is opened in the outer flow path 11C of the damper tube 11. Therefore, the suction port 125 of the hydraulic pump 120 is not opened in the inner peripheral surface of the tube that directly faces the hydraulic chamber of the damper tube 11. As a result, no difficulties arise in the slide and abrasion of the piston 25 that slides on the inner peripheral surface of the tube.

Accordingly, the damper 10A is oscillated by irregularities on a road surface on which the vehicle runs, and the hydraulic pump 120 is caused to perform a pumping operation by the extension and compression movements in which the piston rod 12 enters and leaves the damper tube 11 and the hollow pipe 121. When the pump chamber 122 is pressurized by the pumping operation accompanied by the compression movement of the piston rod 12, the oil of the pump chamber 122 opens the ejection check valve 123 to be ejected to the side of the hydraulic jack 111. When the pressure of the pump chamber 122 becomes negative with the pumping operation accompanied by the extension movement of the piston rod 12, the oil of the damper tube 11 opens the suction check valve 124 to be suctioned into the pump chamber 122.

The vehicle-height adjustment apparatus 100 has a solenoid switching valve 130 that switch-connects the jack chamber 112 of the hydraulic jack 111 and the oil reservoir chamber 32 of the damper 10A (or the hydraulic chambers 27A and 27B of the damper tube 11). The switching valve 130 is closed so as to stop the operating oil supplied to the jack chamber 112 of the hydraulic jack 111 or is opened so as to eject the operating oil to the oil reservoir chamber 32 (or the hydraulic chambers 27A and 27B of the damper tube 11).

As shown in FIG. 8, the vehicle-height adjustment apparatus 100 has a control circuit controlled by an ECU (control unit) 140. The ECU 140 controls energization to a solenoid 130A of the switching valve 130 to control the opening and closing of the switching valve 130. Thus, the ECU 140 adjusts not only the liquid level of the operating oil obtained when the oil ejected by the hydraulic pump 120 caused to perform a pumping operation by the extension and compression movements of the piston rod 12 relative to the damper tube 11 is supplied to and drained from the jack chamber 112 of the hydraulic jack 111 but also the protrusion height of the plunger 113 protruding from the jack chamber 112, thereby adjusting the vehicle height of the vehicle.

The ECU 140 according to the embodiment receives detection signals from a vehicle-height detection unit 150, a vehicle speed sensor 161, a shift position sensor 162, a G-sensor (acceleration and deceleration sensor) 163, a side-stand sensor 164, an engine rotation sensor 165, a brake sensor 166, and the like and controls the ON/OFF of the switching valve 130 composed of a solenoid valve.

The vehicle-height detection unit 150 can include in combination one or two or more of a unit 151 that detects the protrusion height of the plunger 113 in the hydraulic jack 111, a unit 152 that detects the hydraulic pressure of the jack chamber 112 in the hydraulic jack 111, a unit 153 that detects the extension and compression stroke length of the piston rod 12 relative to the damper tube 11.

Hereinafter, in order to explain the vehicle-height adjustment operation of a motorcycle, a description will be given in detail of the vehicle-height adjustment apparatus 100 employing the control circuit shown in FIG. 8 having the switching valve 130 composed of a single two-port two-position solenoid valve. Note that the switching valve 130 shown in FIG. 8 is a normally open valve (or may be a normally closed valve).

In a vehicle-height lowering control mode in which the ECU 140 outputs an OFF-signal, the switching valve 130 is opened to connect the jack chamber 112 of the hydraulic jack 111 to the oil reservoir chamber 32 of the damper tube 11, and the hydraulic pump 120 discharges the operating oil supplied to the jack chamber 112 of the hydraulic jack 111 to the oil reservoir chamber 32 to reduce the liquid level of the jack chamber 112 and the protrusion height of the plunger 113. Thus, a vehicle-height lowering operation is made possible.

On the other hand, in a vehicle-height raising control mode in which the ECU 140 outputs an ON-signal, the switching valve 130 is closed to block the jack chamber 112 of the hydraulic jack 111 from the oil reservoir chamber 32 of the damper tube 11, and the hydraulic pump 120 does not discharge the operating oil supplied to the jack chamber 112 of the hydraulic jack 111. Thus, a vehicle-height keeping operation or a vehicle-height raising operation is made possible. At this time, by the pumping operation accompanied by the extension movement of the piston rod 12, the hydraulic pump 120 is allowed to suction the oil of the damper tube 11 from the suction check valve 124 to the pump chamber 122. Then, by the pumping operation accompanied by the compression movement of the piston rod 12, the hydraulic pump 120 is allowed to supply the oil of the pump chamber 122 from the ejection check valve 123 to the jack chamber 112 of the hydraulic jack 111. Thus, the vehicle-height raising operation is made possible.

The specific control modes of the vehicle-height adjustment apparatus 100 are as follows.

(A) Vehicle-Height Lowering Control Mode

In the vehicle-height adjustment apparatus 100, under the vehicle-height raising control mode in which the switching valve 130 is closed to enable the vehicle-height raising operation, the ECU 140 enters the vehicle-height lowering control mode in which the switching valve 130 is opened depending on any of the following control conditions 1 to 3 during the running of the vehicle or when the vehicle stops for a long period of time.

1. Vehicle-Speed Control

When a vehicle speed V of the vehicle becomes a vehicle-height lowering speed Vd or less ($V \leq Vd$), the ECU 140 enters the vehicle-height lowering control mode and opens the switching valve 130 to enable the vehicle-height lowering operation.

The ECU 140 configures the vehicle-height lowering speed Vd in advance. For example, the vehicle-height lowering speed Vd is set at 10 km/h.

2. Stop-Time Prediction Control

The ECU 140 predicts a stop time T of the vehicle. When the predicted stop time T becomes a prescribed reference stop time Ta or less ($T \leq Ta$), the ECU 140 enters the vehicle-height lowering control mode and opens the switching valve 130 to enable the vehicle-height lowering operation.

The ECU 140 calculates the deceleration of the vehicle from the vehicle speed or detects the deceleration of the vehicle with the G-sensor 163. Based on the deceleration thus calculated, the ECU 140 predicts the stop time T.

The ECU 140 sets the reference stop time Ta as a time at which the operating oil filled in the jack chamber 112 of the hydraulic jack 111 is to be discharged (from the jack chamber 112 to the oil reservoir chamber 32 of the damper tube 11 via the switching valve 130).

At this time, the ECU 140 configures in advance the reference vehicle speed Va at which the prediction of the stop time T of the vehicle is to be started. When the vehicle speed V of the vehicle becomes the reference vehicle speed Va or less ($V \leq Va$), the ECU 140 predicts the stop time T.

Note that instead of satisfying the control conditions $T \leq Ta$ and $V \leq Va$ described above, the ECU 140 may enter the vehicle-height lowering control mode and open the switching valve 130 to enable the vehicle-height lowering operation when deceleration $\alpha$ of the vehicle becomes prescribed reference deceleration $\alpha a$ or more ($\alpha \geq \alpha a$).

The ECU 140 configures the reference vehicle speed Va, the reference stop time Ta, and the reference deceleration $\alpha a$ in advance. For example, the reference vehicle speed Va is set at 40 km/h, the reference stop time Ta is set at 2.5 sec., and the reference deceleration $\alpha a$ is set at 4 km/h/sec.

Note that the predicted stop time is a parameter that is predicted and calculated from vehicle motion parameters on a time basis and represents time required until the running vehicle will stop in the near future, and shows the dimension of time.

In performing actual comparison calculation, there is a case that comparison calculation apparently taking no order of "time" is performed since the dimension of time is divided into both sides of a comparison formula or comparison is performed for each element.

For example, the simplest one of the formulae for calculating a predicted stop time is $T=-V/\alpha=-V \cdot dt/dV$ (calculation formula where a uniform acceleration motion is assumed). However, all the following three comparison formulae have the same meaning and effectively represent that the comparison calculation of a predicted stop time is performed even if there is a difference in comparison method for performing the calculation between these formulae.

$T < c$ (where $c$ represents a threshold, here $c = Ta$)

$V < -c \cdot \alpha$ $-\alpha > c \cdot V$

Moreover, as an example for performing comparison for each element, there is a case that comparison is performed for each of the elements V and α used for calculating a predicted stop time to find a logical product as in the formula (V<c1) ∩(−α>c2) (where c1 and c2 represent thresholds).

In this case, the formula Ta=(−c1)/(−c2)=c1/C2 can be expressed based on the formula T=−V/α.

3. Side-Stand Control

When detecting that the side stand of the vehicle has been moved from the standby position to the operation position, the ECU 140 enters the vehicle-height lowering control mode and opens the switching valve 130 to enable the vehicle-height lowering operation. In addition, by monitoring the vehicle speed, the ECU 140 can perform control in such a manner that lowering control is not performed even if the stand is put in the operation position when the vehicle speed is a creep speed or more (e.g., 5 km/h) but is performed only when the vehicle speed is 0.

(B) Vehicle-Height Raising Control Mode

In the vehicle-height adjustment apparatus 100, under the vehicle-height lowering control mode in which the switching valve 130 is kept open as described in (A), the ECU 140 enters the vehicle-height raising control mode in which the switching valve 130 is closed depending on any of the following control conditions 1 to 4.

Note that when entering the vehicle-height raising control mode and bringing the switching valve 130 from the open state into the closed state, the ECU 140 turns off a voltage E0 applied to the switching valve 130 (E0=0V).

1. Vehicle-Speed Control

When the vehicle speed V of the vehicle exceeds the vehicle-height lowering speed Vd (or a vehicle-height raising speed Vu set independently of the vehicle-height lowering speed Vd) (V>Vd or V>Vu), the ECU 140 cancels the vehicle-height lowering control mode, enters the vehicle-height raising control mode, and closes the switching valve 130 to enable the vehicle-height raising operation.

The ECU 140 configures the vehicle-height lowering speed Vd (or the vehicle-height raising speed Vu) in advance. For example, the Vd or Vu is set at 40 km/h.

2. Predicted Stop Time Control

The ECU 140 predicts a stop time T of the vehicle. When the predicted stop time T exceeds a prescribed subsidiary reference stop time Tb (T>Tb), the ECU 140 cancels the vehicle-height lowering control mode, enters the vehicle-height raising control mode, and closes the switching valve 130 to enable the vehicle-height raising operation.

The ECU 140 predicts the stop time T of the vehicle from the deceleration (or the acceleration) of the vehicle.

At this time, the ECU 140 configures in advance the subsidiary reference vehicle speed Vb at which the prediction of the stop time T of the vehicle is to be started. When the vehicle speed V of the vehicle exceeds the subsidiary reference vehicle speed Vb (V>Vb), the ECU 140 predicts the stop time T.

Note that instead of satisfying the control conditions T>Tb and V>Vb described above, the ECU 140 may cancel the vehicle-height lowering control mode, enter the vehicle-height raising control mode, and close the switching valve 130 to enable the vehicle-height raising operation when acceleration β of the vehicle exceeds prescribed reference acceleration βb (β>βb).

The ECU 140 configures the subsidiary reference vehicle speed Vb, the subsidiary reference stop time Tb, and the reference acceleration βa in advance. For example, the subsidiary reference vehicle speed Vb is set at 40 km/h, the subsidiary reference stop time Tb is set at 3 sec., and the reference acceleration βb is set at 5 km/h/sec.

3. Long Time Stop Control

When the stop time of the vehicle becomes a prescribed continuous stop time Tc or more, the ECU 140 cancels the vehicle-height lowering control mode, enters the vehicle-height raising control mode, and closes the switching valve 130 to enable the vehicle-height raising operation.

The ECU 140 configures the continuous stop time Tc in advance. For example, the continuous stop time Tc is set at 30 sec.

4. Neutral Control

When the vehicle speed of vehicle is 0 and the shift position of the vehicle is neutral, the ECU 140 cancels the vehicle-height lowering control mode, enters the vehicle-height raising control mode, and closes the switching valve 130 to enable the vehicle-height raising operation.

(C) Vehicle-Height Keeping Mode

In the vehicle-height adjustment apparatus 100, the ECU 140 controls the opening and closing of the switching valve 130 based on the detection result of the vehicle-height detection unit 150 during the running of the vehicle, thereby keeping the vehicle height at any intermediate height position desirably set in advance.

In other words, the ECU 140 opens the switching valve 130 by switching from the ON-operation (vehicle-height raising control mode) to the OFF-operation and sets at H1 the upper threshold of the vehicle height at which the vehicle-height lowering operation is to be started. In addition, the ECU 140 closes the switching valve 130 by switching from the OFF-operation (vehicle-height lowering control mode) to the ON-operation and sets at H2 the lower threshold of the vehicle height at which the vehicle-height raising operation is to be started. Thus, based on the detection result of the vehicle-height detection unit 150, the ECU 140 keeps the vehicle height of the motorcycle during running at an intermediate height position set between H1 and H2.

Thus, according to the vehicle-height adjustment apparatus 100, the vehicle height can be kept at any intermediate height position between the highest position defined by the possible maximum protruding end of the plunger 113 in the hydraulic jack 111 and the lowest height position defined by the possible minimum withdrawing end of the plunger 113 in the hydraulic jack 111.

In addition, with the use of a solenoid valve as the switching valve 130 serving as a unit that switches the vehicle height, the vehicle height can be instantaneously switched.

Note that with the use of the unit 151 that detects the protrusion height of the plunger 113 in the hydraulic jack 111 as the vehicle-height detection unit 150, the vehicle height at detection can be estimated.

Moreover, with the use of the unit 152 that detects the hydraulic pressure of the jack chamber 112 in the hydraulic jack 111 as the vehicle-height detection unit 150, the vehicle height at detection can be estimated. At this time, the vehicle weight (mounting load) of the vehicle can be estimated by the application of the detection result of the unit 152 to a filter (low-pass). If the vehicle height begins to be lowered due to the heavy weight of the vehicle, the vehicle height is raised to prevent the bottom protrusion of the damper 10A. If the vehicle height begins to be raised due to the light weight of the vehicle, the vehicle height is lowered to prevent the extension of the damper 10A.

Furthermore, with the use of the unit 153 that detects the extension and compression stroke length of the piston rod 12 relative to the damper tube 11 as the vehicle-height detection unit 150, the vehicle height at detection can be estimated. At this time, the irregularities condition (amplitude condition) of a road surface can be estimated by the application of the detection result of the unit 153 to a filter (band-pass). If the amplitude of the road surface is large, the vehicle height is raised to prevent the bottom protrusion of the damper 10A or the vehicle height is appropriately adjusted to prevent both the bottom protrusion and the extension of the damper 10A. If the amplitude of the road surface is small, the vehicle height is lowered to reduce the resistance of wind where the vehicle is of an on-road type and to prevent the back-and-forth shaking (pitching) of the vehicle where the vehicle is of an off-road type.

The embodiment of the present invention is described in detail above. However, the specific configurations of the present invention are not limited to the embodiment, and the modifications of design or the like without departing from the spirit of the present invention may also be included in the present invention.

Figure 9:
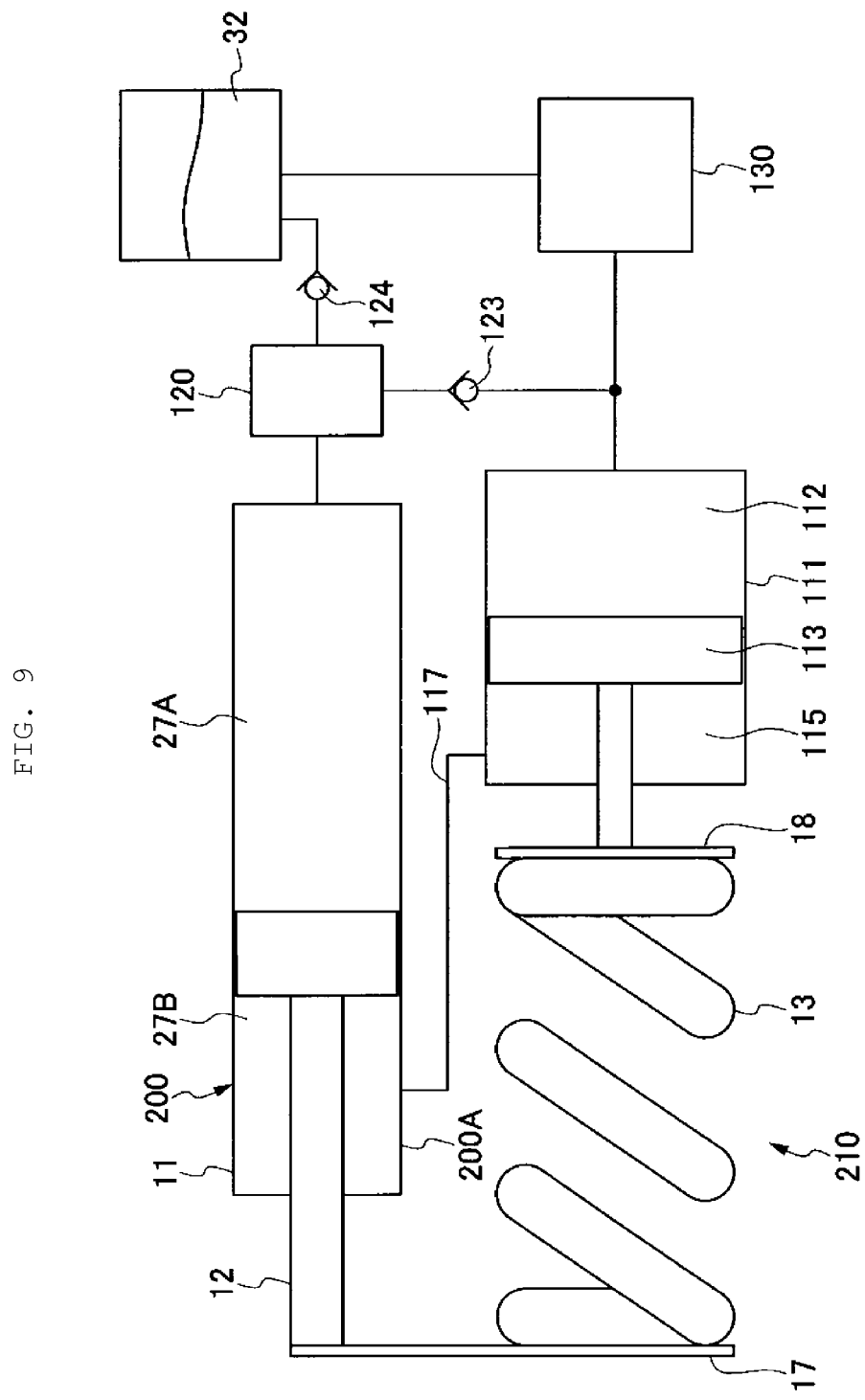
FIG. 9 is a circuit diagram showing a modification of the vehicle-height adjustment apparatus.

For example, FIG. 9 shows a modification of the present invention in which a vehicle-height adjustment apparatus 210 according to the present invention is applied to a normal hydraulic shock absorber 200.

The hydraulic shock absorber 200 has a damper 200A in which the piston rod 12 slides in the hydraulic chambers 27A and 27B inside the damper tube 11. In the vehicle-height adjustment apparatus 210, the plunger 113 is inserted in the jack chamber 112 inside the hydraulic jack 111 provided on one side of the damper tube 11 and the piston rod 12, and the suspension spring 13 is interposed between the spring bearing 17 provided on the vehicle-height side of the damper tube 11 and the piston rod 12 and the spring bearing 18 supported by the plunger 113. By the switching valve 130 and the hydraulic pump 120 caused to perform a pumping operation by the extension and compression movements of the piston rod 12 relative to the damper tube 11, the oil of the hydraulic chamber inside the damper tube 11 is supplied to and drained from the jack chamber 112 of the hydraulic jack 111 to adjust the vehicle height.

Here, the vehicle-height adjustment apparatus 210 can correspond to the same configurations as those of the vehicle-height adjustment apparatus 100 in order to stabilize the damping force characteristics of the damper 200A, eliminate the influence of the charged gas pressure of the oil reservoir chamber 32, and reduce the sealing performance of the hydraulic jack 111. For example, in the vehicle-height adjustment apparatus 210, the back pressure chamber 115 is provided on the side opposite to the jack chamber 112 with the plunger 113 interposed therebetween inside the hydraulic jack 111 and is communicated with the rod-side hydraulic chamber 27B inside the damper tube 11 (or may be communicated with the piston-side hydraulic chamber 27A and the oil reservoir chamber 32 inside the damper tube 11).

According to an embodiment of the present invention, there is provided a vehicle-height adjustment apparatus of a motorcycle for adjusting a vehicle height, this apparatus including: a damper in which a piston rod slides in a hydraulic chamber inside a damper tube; a hydraulic jack provided on one of the damper tube and the piston rod; a jack chamber provided inside the hydraulic jack; a plunger inserted in the jack chamber; a suspension spring interposed between a spring bearing provided on the other one of the damper tube and the piston rod and a spring bearing supported by the plunger, and a hydraulic pump that is caused to perform a pumping operation by extension and compression movements of the piston rod relative to the damper tube and supplies and drains oil of the hydraulic chamber inside the damper tube to and from the jack chamber of the hydraulic jack, this apparatus further comprising: a back pressure chamber that is provided on a side opposite to the jack chamber, with the plunger being interposed therebetween inside the hydraulic jack, and that is communicated with the hydraulic chamber inside the damper tube. Thus, the vehicle-height adjustment apparatus of a motorcycle having a hydraulic jack attached to a damper can stabilize the damping force characteristics of the damper, eliminate the influence of the charged gas pressure of an oil reservoir chamber, and reduce the sealing performance of the hydraulic jack.

EXPLANATION OF REFERENCE NUMERALS

10: hydraulic shock absorber
10A: damper
11: damper tube
12: piston rod
13: suspension spring
17, 18: spring bearing
27A: piston-side hydraulic chamber
27B: rod-side hydraulic chamber
32: oil reservoir chamber
100: vehicle-height adjustment apparatus
111: hydraulic jack
112: jack chamber
113: plunger
115: back pressure chamber
120: hydraulic pump

What is claimed is:

1. A vehicle-height adjustment apparatus of a motorcycle including a damper in which a piston rod slides in a hydraulic chamber inside a damper tube, and a suspension spring,
the vehicle-height adjustment apparatus comprising:
a hydraulic jack provided on one of the damper tube and the piston rod;
a jack chamber provided inside the hydraulic jack;
a plunger inserted in the jack chamber;
a spring bearing supported by the plunger, wherein the suspension spring is interposed between the spring bearing and a spring bearing provided on the other one of the damper tube; and
a hydraulic pump that is caused to perform a pumping operation by extension and compression movements of the piston rod relative to the damper tube and supplies and drains oil of the hydraulic chamber inside the damper tube to and from the jack chamber of the hydraulic jack, whereby adjusting a vehicle height,
wherein the vehicle-height adjustment apparatus further comprises a back pressure chamber that is provided on a side opposite to the jack chamber, with the plunger being interposed therebetween inside the hydraulic jack, and that is communicated with the hydraulic chamber inside the damper tube.

2. The vehicle-height adjustment apparatus of the motorcycle according to claim 1, wherein a pressure receiving area of the plunger on a side of the jack chamber is made different from a pressure receiving area of the plunger on a side of the back pressure chamber inside the hydraulic jack.

3. The vehicle-height adjustment apparatus of the motorcycle according to claim 1, wherein the pressure receiving area of the plunger on the side of the jack chamber is made substantially the same as the pressure receiving area of the plunger on the side of the back pressure chamber inside the hydraulic jack.

4. The vehicle-height adjustment apparatus of the motorcycle according to claim 1, wherein the jack chamber and the back pressure chamber inside the hydraulic jack are communicated with a piston-side hydraulic chamber and a rod-side hydraulic chamber inside the damper tube, respectively, and a hydraulic pressure of the jack chamber is made different from a hydraulic pressure of the back pressure chamber by a pressure of a damping force of the damper.

5. The vehicle-height adjustment apparatus of the motorcycle according to claim 2, wherein the jack chamber and the back pressure chamber inside the hydraulic jack are communicated with a piston-side hydraulic chamber and a rod-side hydraulic chamber inside the damper tube, respectively, and a hydraulic pressure of the jack chamber is made different from a hydraulic pressure of the back pressure chamber by a pressure of a damping force of the damper.

6. The vehicle-height adjustment apparatus of the motorcycle according to claim 3, wherein the jack chamber and the back pressure chamber inside the hydraulic jack are communicated with a piston-side hydraulic chamber and a rod-side hydraulic chamber inside the damper tube, respectively, and a hydraulic pressure of the jack chamber is made different from a hydraulic pressure of the back pressure chamber by a pressure of a damping force of the damper.

* * * * *